United States Patent
Chou et al.

(10) Patent No.: US 9,451,192 B2
(45) Date of Patent: Sep. 20, 2016

(54) BIAS CONTROL VIA SELECTIVE COUPLING OF BIAS TRANSISTORS TO PIXEL OF IMAGE SENSOR

(71) Applicant: Taiwan Semiconductor Manufacturing Company Limited, Hsin-Chu (TW)

(72) Inventors: Kuo-Yu Chou, Hsinchu (TW); Calvin Yi-Ping Chao, Zhubei (TW)

(73) Assignee: Taiwan Semiconductor Manufacturing Company Limited, Hsin-Chu (TW)

( * ) Notice: Subject to any disclaimer, the term of this patent is extended or adjusted under 35 U.S.C. 154(b) by 343 days.

(21) Appl. No.: 13/728,297

(22) Filed: Dec. 27, 2012

(65) Prior Publication Data

US 2014/0184316 A1    Jul. 3, 2014

(51) Int. Cl.
*H01L 27/00* (2006.01)
*H04N 5/378* (2011.01)
*H04N 5/357* (2011.01)

(52) U.S. Cl.
CPC .......... *H04N 5/378* (2013.01); *H04N 5/3575* (2013.01)

(58) Field of Classification Search
CPC ... H04N 5/3658; H04N 5/3742; H04N 5/378

USPC ...................................................... 250/208.1
See application file for complete search history.

(56) References Cited

U.S. PATENT DOCUMENTS

| | | | |
|---|---|---|---|
| 7,045,754 B2 | 5/2006 | Manabe et al. | |
| 7,244,920 B2* | 7/2007 | Kim et al. | 250/208.1 |
| 7,995,126 B2* | 8/2011 | Sato | 348/308 |
| 2007/0241258 A1* | 10/2007 | Altice | H04N 3/155 250/208.1 |

* cited by examiner

*Primary Examiner* — Thanh Luu
(74) *Attorney, Agent, or Firm* — Cooper Legal Group, LLC

(57) ABSTRACT

One or more techniques or systems for bias control are provided herein. In some embodiments, the bias control relates to biasing of a column of one or more pixels for an image sensor. In some embodiments, an associated circuit includes a reset transistor, a source-follower transistor, a first transfer transistor, a first bias transistor, a second bias transistor, and a switch connected to the second bias transistor. In some embodiments, the first bias transistor and the second bias transistor bias a column of pixels at a first time. In some embodiments, the second bias transistor is turned off, thus removing a second bias at a second time. In this way, performance of the image sensor is improved, at least because the second bias transistor enables faster settling time when active, and a wide pixel operation range when switched off.

20 Claims, 4 Drawing Sheets

BIAS CONTROL VIA SELECTIVE COUPLING OF BIAS TRANSISTORS TO PIXEL OF IMAGE SENSOR

BACKGROUND

Generally, image sensors, such as complementary metal oxide semiconductor (CMOS) image sensors comprise one or more pixels. For example, a pixel is generally associated with one or more transistors, such as a reset transistor, a source-follower (SF) transistor, or a transfer transistor. However, when loading associated with a sensor increases, settling times often increase, and pixel operation range may suffer.

SUMMARY

This summary is provided to introduce a selection of concepts in a simplified form that are further described below in the detailed description. This summary is not intended to be an extensive overview of the claimed subject matter, identify key factors or essential features of the claimed subject matter, nor is it intended to be used to limit the scope of the claimed subject matter.

One or more techniques or systems for controlling bias are provided herein. For example, bias control relates to biasing a column of one or more pixels for an image sensor. In some embodiments, a first bias transistor is configured to apply a first bias to the column at a first time. In some embodiments, a second bias transistor is configured to apply a second bias to the column at the first time. In this way, a larger bias current is drawn from the column, thus reducing an associated correlated double sampling (CDS) time by mitigating a settling time associated with the image sensor based on the increased bias current. In some embodiments, a switch connected to the second bias transistor is configured to remove the second bias from the column at a second time. In this way, the bias current is reduced at the second time, thus enhancing pixel operation.

The following description and annexed drawings set forth certain illustrative aspects and implementations. These are indicative of but a few of the various ways in which one or more aspects are employed. Other aspects, advantages, or novel features of the disclosure will become apparent from the following detailed description when considered in conjunction with the annexed drawings.

DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

Figure 1:
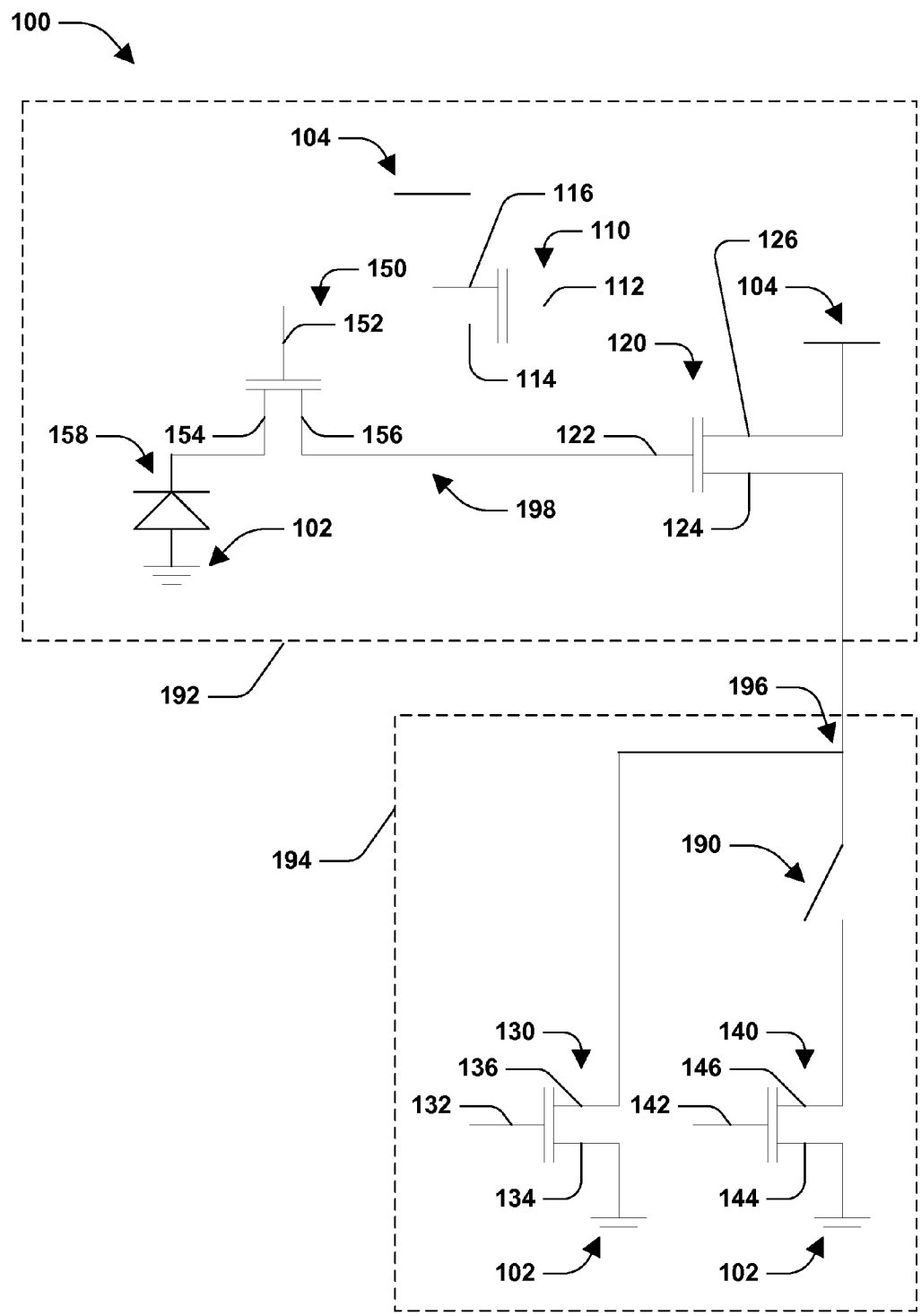
FIG. 1 is a circuit diagram of an example pixel and associated bias circuit, according to some embodiments.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

It will be appreciated that for at least some of the figures herein, one or more boundaries, such as boundary 192 or 194 of FIG. 1, for example, are drawn with different heights, widths, perimeters, aspect ratios, etc. relative to one another merely for illustrative purposes, and are not necessarily drawn to scale. For example, because dashed or dotted lines are used to represent different boundaries, if the dashed and dotted lines were drawn on top of one another they would not be distinguishable in the figures, and thus are drawn slightly apart from one another, in at least some of the figures, so that they are distinguishable from one another, for example. As another example, because a component is associated with an irregular shape, such as a portion of a circuit, a box drawn with a dashed line, dotted lined, etc. does not necessarily encompass an entire component, portion, circuit, etc. Similarly, a drawn box does not necessarily encompass merely the associated component, portion, or circuit, but encompasses at least some of one or more other components, portions, or circuits as well, in some embodiments. Accordingly, dimensions of some of these boundaries are drawn taller, shorter, wider, narrower, etc. than needed in some embodiments so that the different boundaries are visible in the figures, for example.

FIG. 1 is a circuit diagram 100 of an example pixel and associated bias circuit, according to some embodiments. In some embodiments, a sensor, such as a complementary metal oxide semiconductor (CMOS) sensor comprises one or more pixels, such as pixel 192 and one or more bias control portions 194. In some embodiments, pixel 192 is associated with one or more transistors. For example, pixel 192 is associated with at least one of a reset transistor 110, a source-follower (SF) transistor 120, or a transfer transistor 150. In some embodiments, the pixel 192 is associated with a sensor, such as a photo diode 158. In some embodiments, at least one of the reset transistor 110, the SF transistor 120, or the transfer transistor 150 is an n-type metal oxide semiconductor (NMOS) transistor. In some embodiments, the reset transistor 110 comprises a reset gate 112, a reset source 114, and a reset drain 116. In some embodiments, the reset drain 116 is connected to a positive supply voltage (Vdd) 104. In some embodiments, the SF transistor 120 comprises a SF gate 122, a SF source 124, and a SF drain 126. In some embodiments, the SF drain 126 is connected to Vdd 104. In some embodiments, Vdd 104 is a reset voltage, for example. In some embodiments, the first transfer transistor 150 comprises a first transfer gate 152, a first transfer source 154, and a first transfer drain 156. In some embodiments, the first transfer source 154 is connected to the photo diode 158. Additionally, the photo diode 158 is connected to a negative supply voltage (Vss) 102, for example. In some embodiments, Vss 102 is ground, for example. According to some aspects, the reset source 114 is connected to at least one of the SF gate 122 or the first transfer drain 156. In some embodiments, at least one of the reset source 114, the SF gate 122, or the first transfer drain 156 is connected at a floating diffusion (FD) node 198.

In some embodiments, the one or more bias control portions 194 are associated with one or more transistors. For example, a first bias control portion of the one or more bias control portions 194 is associated with a first bias transistor 130. For example, a second bias control portion of the one or more bias control portions 194 is associated with a switch 190 and a second bias transistor 140. In some embodiments, at least one of the first bias transistor 130 or the second bias transistor 140 is an NMOS transistor. In some embodiments, the first bias transistor 130 comprises first bias gate 132, a first bias source 134, and a first bias drain 136. In some embodiments, the first bias source 134 is connected to Vss 102 or ground. In some embodiments, the second bias transistor 140 comprises a second bias gate 142, a second bias source 144, and a second bias drain 146. In some embodiments, the second bias source 144 is connected to Vss 102 or ground. In some embodiments, the second bias control portion comprises the switch 190 and the second bias transistor 140. Additionally, the switch 190 is connected to the second bias drain 146. In some embodiments, the switch 190 is connected to at least one of the first bias drain 136, the second bias drain 146, or the SF source 124. In other words, the switch 190 is connected to the second bias drain 146 and the SF source 124 is connected to at least one of the switch 190 or the first bias drain 136. In some embodiments, at least one of the SF source 124, the switch 190, or the first bias drain 136 is connected at an output node 196. It will be appreciated that in some embodiments, the output node 196 is connected to a column of one or more pixels. In some embodiments, at least one of the first bias transistor 130 or the second bias transistor 140 is in a saturation region of operation. In some embodiments, a bias current is associated with the SF source 124, such as during a readout operation for the pixel 192. In some embodiments, the first bias control portion is associated with a first bias and the second bias control portion is associated with a second bias. For example, the first bias transistor 130 of the first bias control portion is configured to draw or apply a first bias. Similarly, when switch 190 is closed, the second bias transistor 140 of the second bias control portion is configured to draw or apply a second bias. In some embodiments, the first bias plus the second bias is equal to the bias current associated with the SF source 124. In some embodiments, the switch 190 is configured to close based on a readout settling associated with the circuit 100 of FIG. 1. For example, the switch 190 is configured to close at least until a voltage associated with at least one of the FD node 198, a column of one or more pixels, or the output node 196 is almost settled or stable, for example. In some embodiments, the second bias transistor 140 is configured to speed up settling associated with the first bias transistor 130. For example, the first bias transistor 130 and the second bias transistor 140 are on at a first stage or a first time, and switch 190 is closed. In some embodiments, the voltage associated with at least one of the FD node 198 or the output node 196 is settling during the first stage or first time. In some embodiments, the second bias transistor 140 is configured to speed up settling associated with the first bias transistor 130 for a period of time. In this way, the second bias transistor 140 and the switch 190 facilitate a quicker settling for the circuit and maintain a saturation region of operation for the first bias transistor 130. In some embodiments, the switch 190 is opened or closed based on a target output voltage. For example, at a second stage or second time, switch 190 is opened, and merely the first bias transistor 130 is active, at least because switch 190 disconnects the second bias transistor 140 from the circuit. In some embodiments, the voltage associated with at least one of the FD node 198 or the output node 196 is substantially settled, substantially stable, or almost settled, etc. during the second stage or second time. In some embodiments, the switch 190 is configured to close to a period of time associated with a settling time of circuit 100. In this way, the switch 190 is configured to control the bias current associated with the output node 196 or a column of one or more pixels, for example.

Generally, a sensor, such as a CMOS sensor comprises one or more pixels. For example, the sensor comprises a column of one or more pixels. In some embodiments, the sensor is associated with a settling time for row operation of the sensor. In some embodiments, the switch 190 enables the second bias transistor 140 to improve operation of the sensor, such as by reducing the settling time associated with the sensor. In some embodiments, a first bias is applied to the column of one or more pixels at a first time based on the first bias transistor 130. Additionally, when switch 190 is closed, a bias current associated with the output node 196 is increased, thus reducing a correlated double sampling (CDS) time and improving a frame rate for the sensor. In some embodiments, a second bias is applied to the column of one or more pixels at the first time based on the switch 190 and the second bias transistor 140. When a threshold, such as a settling threshold is achieved, switch 190 is opened, thereby removing the second bias and improving a pixel operation range of the sensor. In some embodiments, at least one of the threshold is achieved or the switch 190 is opened at a second time. For example, the threshold is based on settling associated with at least one of the FD node 198 or the output node 196. Accordingly, the second bias is removed from the column of one or more pixels at the second time based on opening the switch 190. In some embodiments, at least one of the first bias transistor 130 or the second bias transistor 140 is configured to operate in a saturation mode. In some embodiments, as switch 190 is turned off, the first bias transistor 130 settles toward a saturation region of operation. For example, after at least one of the FD node 198, the output node 196, or a column of one or more pixels settles, the first bias transistor 130 reaches a saturation region of operation. Additionally, in some embodiments, a final settling voltage is determined by the first bias transistor 130, at least because the second bias transistor 140 is disconnected during a second stage or second time when switch 190 is opened. Accordingly, it will be appreciated that the second bias transistor 140 is configured to speed up settling to the final settling voltage, for example.

In some embodiments, at least one of the reset transistor 110, the SF transistor 120, or the transfer transistor 150 is an NMOS transistor. Accordingly, when a logic high voltage is applied to a gate of an NMOS transistor, the NMOS transistor is turned on, forming a connection from a source of the NMOS transistor to a drain of the NMOS transistor. In some embodiments, the reset drain 116 is connected to Vdd 104 or a reset voltage, for example. In some embodiments, the reset transistor 110 is turned on by providing a logic high to the reset gate 112. Accordingly, the reset drain 116 is shorted to the reset source 114. It will be appreciated that the reset source 114 is connected to the FD node 198. In this way, the FD node 198 is set to at least one of Vdd 104 or the reset voltage. In some embodiments, the FD node 198 is associated with a voltage less than Vdd 104 or the reset voltage, at least because of a first threshold voltage drop associated with the reset transistor 110, such as Vdd−Vth1. In other embodiments, the FD node 198 is associated with Vdd 104 or the reset voltage. It will be appreciated that the SF gate 122 is connected to the FD node 198. Accordingly, the SF gate 122 is associated with the same voltage as the FD node 198. In this way, the SF gate 122 is associated with at least one of Vdd 104, the reset voltage, or Vdd−Vth1, for example. In some embodiments, the voltage at the FD node 198 achieved by turning the reset transistor 110 on in turn, enables the SF transistor 120 to turn on. Accordingly, the SF transistor 120 is configured to connect the SF drain 126 to the SF source 124. For example, the SF drain 126 is connected to Vdd 104. Accordingly, when the SF transistor 120 is turned on, the SF source 124 is associated with a voltage less than Vdd 104 or the reset voltage, at least because of the SF transistor 120 is associated with a second threshold voltage drop. For example, the SF source 124 is at Vdd−Vth2. In some embodiments, the output node 196 is thus pulled up to Vdd−Vth2. In some embodiments, the circuit 100 of FIG. 1 is associated with a column of one or more pixels, as will be described in FIG. 2, for example. In some embodiments, the first bias transistor 130 is configured to apply a first bias to the column at a first time. Additionally, the second bias transistor 140 is configured to apply a second bias to the column at the first time. In some embodiments, a second time is after the first time, such as when at least one of the FD node 198 or the output node 196 settles. In some embodiments, the settling is based on a settling threshold, for example. In some embodiments, the switch 190 is configured to remove the second bias from the second bias transistor 140 at the second time. In this way, column bias control is provided.

Figure 2:
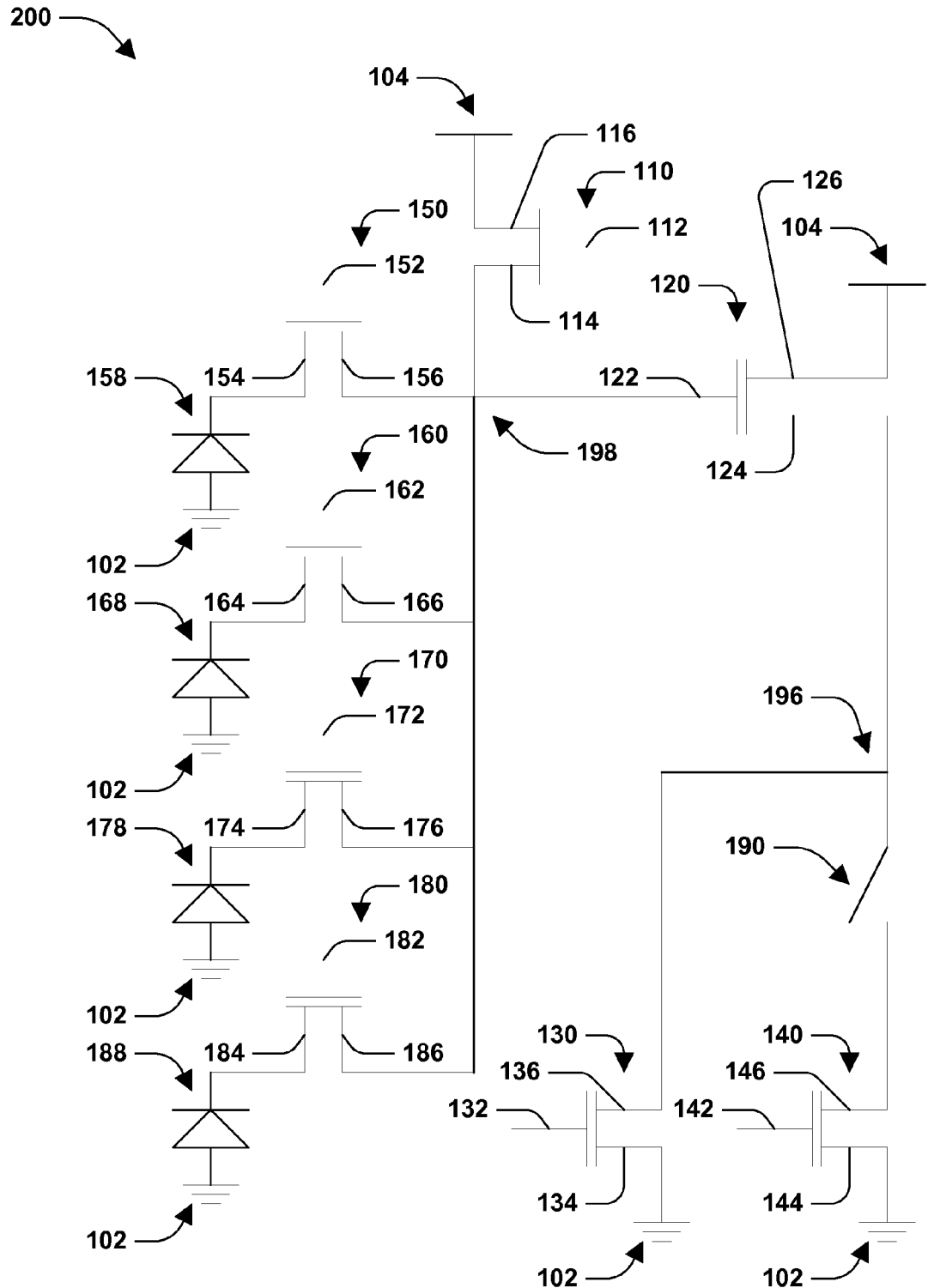
FIG. 2 is a circuit diagram of example pixels and an associated bias circuit, according to some embodiments.

FIG. 2 is a circuit diagram 200 of example pixels and an associated bias circuit, according to some embodiments. It will be appreciated that the circuit 200 of FIG. 2 is similar to the circuit 100 of FIG. 1, except that the circuit 200 of FIG. 2 comprises one or more additional transfer transistors. In some embodiments, the circuit 200 comprises a second transfer transistor 160, a third transfer transistor 170, and a fourth transfer transistor 180. In some embodiments, a first pixel is associated with the reset transistor 110, the SF transistor 120, and the first transfer transistor 150. In some embodiments, a second pixel is associated with the reset transistor 110, the SF transistor 120, and the second transfer transistor 160. In some embodiments, a third pixel is associated with the reset transistor 110, the SF transistor 120, and the third transfer transistor 170. In some embodiments, a fourth pixel is associated with the reset transistor 110, the SF transistor 120, and the fourth transfer transistor 180. In this way, the circuit 200 of FIG. 2 is associated with a column of one or more pixels. It will be appreciated that in some embodiments, the circuit 200 is associated with a row of one or more pixels, rather than a column of one or more pixels, at least because an orientation of an associated layout is changed, for example. Additionally, it will be appreciated that a column in some embodiments, corresponds to a row in some other embodiments, for example. In some embodiments, the second transfer transistor 160 comprises a second transfer gate 162, a second transfer source 164, and a second transfer drain 166. In some embodiments, the second transfer drain 166 is connected to the FD node 198. In some embodiments, the third transfer transistor 170 comprises a third transfer gate 172, a third transfer source 174, and a third transfer drain 176. In some embodiments, the third transfer drain 176 is connected to the FD node 198. In some embodiments, the fourth transfer transistor 180 comprises a fourth transfer gate 182, a fourth transfer source 184, and a fourth transfer drain 186. In some embodiments, the fourth transfer drain 186 is connected to the FD node 198. Additionally, respective sources of respective additional transfer transistors are connected to a sensor, such as a photo diode, for example. In some embodiments, the second transfer source 164 is connected to a second sensor 168, and the second sensor 168 is connected to Vss 102. In some embodiments, the third transfer source 174 is connected to a third sensor 178, and the third sensor 178 is connected to Vss 102. In some embodiments, the fourth transfer source 184 is connected to a fourth sensor 188, and the fourth sensor 188 is connected to Vss 102. In some embodiments, Vss 102 is ground, for example. In this way, it is seen that one or more additional transfer transistors are connected to the FD node 198 in FIG. 2.

Figure 3:
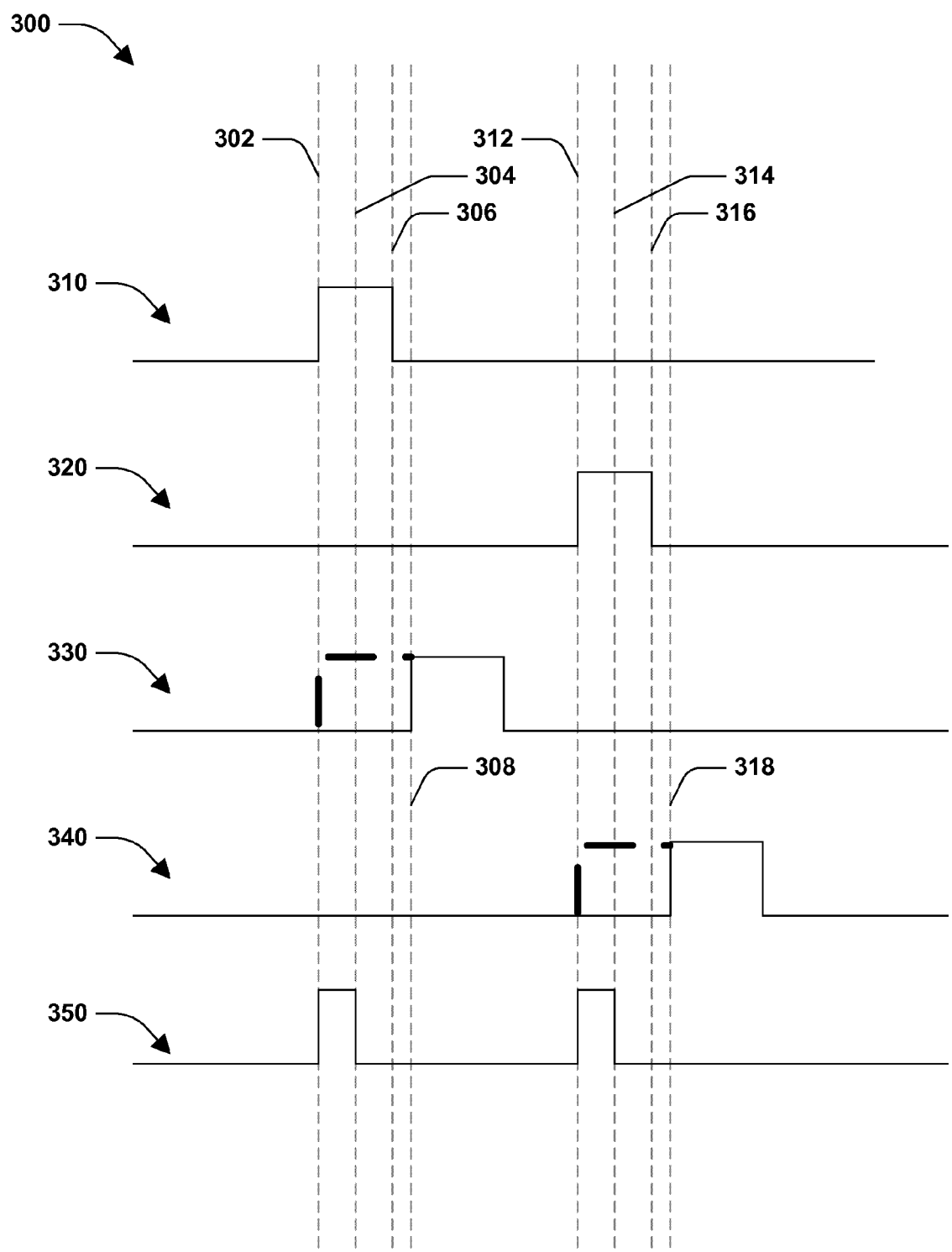
FIG. 3 is a timing diagram for an example pixel and associated bias circuit, according to some embodiments.

FIG. 3 is a timing diagram 300 for an example pixel and associated bias circuit, according to some embodiments. It will be appreciated that the timing diagram 300 of FIG. 3 is described with respect to a circuit associated with a column of one or more pixels and two or more bias portions, such as the circuit 100 of FIG. 1, for example. In some embodiments, 310 is a signal provided to the reset gate 112 of the reset transistor 110. Accordingly, this turns the reset transistor 110 on and enables the FD node 198 to reach at least one of Vdd 104 or a reset voltage, for example. Additionally, 330 is a sampling reset signal. In some embodiments, the sampling reset signal samples the voltage at the output voltage of the SF transistor 120 when the output node 196 is settling, for example. In some embodiments, this sampling is a first sampling used for a correlated double sampling (CDS) associated with the circuit 100 of FIG. 1, for example. Additionally, 320 is a signal provided to the first transfer gate 152 of the first transfer transistor 150. Accordingly, this turns the first transfer transistor 150 on and reads a signal from the sensor 158 or photo diode, for example. Additionally, 340 is a sampling signal level. In some embodiments, the sampling signal level samples the voltage at the output node 196 of the SF transistor 120 when at least one of the FD node 198 settles or the output node 196 of the SF transistor 120 settles, for example. In some embodiments, this sampling is a second sampling used for the CDS associated with circuit 100, for example. Additionally, 350 is a switch signal associated with operation of switch 190, for example. It will be appreciated that in some embodiments, a second switch is used to control the first bias transistor 130. In some embodiments, the reset gate signal 310 is logic high from time 302 to 306. In some embodiments, the switch signal 350 is high from 302 to 304. In some embodiments, the sampling reset signal 330 is high at time 302, as indicated by a dashed line, for example. In other embodiments, the sampling reset signal 330 is high at time 308. In some embodiments, the first transfer signal 320 is high from a read time 312 to 316. In some embodiments, the sampling signal level is high at time 312, as indicated by a dashed line, for example. In other embodiments, the sampling signal level is high at time 318. In some embodiments, the switch signal is high from 312 to 314, for example. In some embodiments, at first timing is associated with the high switch signal 350 from 302 to 304. In some embodiments, at second timing is associated with the low switch signal 350 from 304 to 306. In some embodiments, at third timing is associated with the high switch signal 350 from 312 to 314. In some embodiments, at fourth timing is associated with the low switch signal 350 from 314 to 316.

Figure 4:
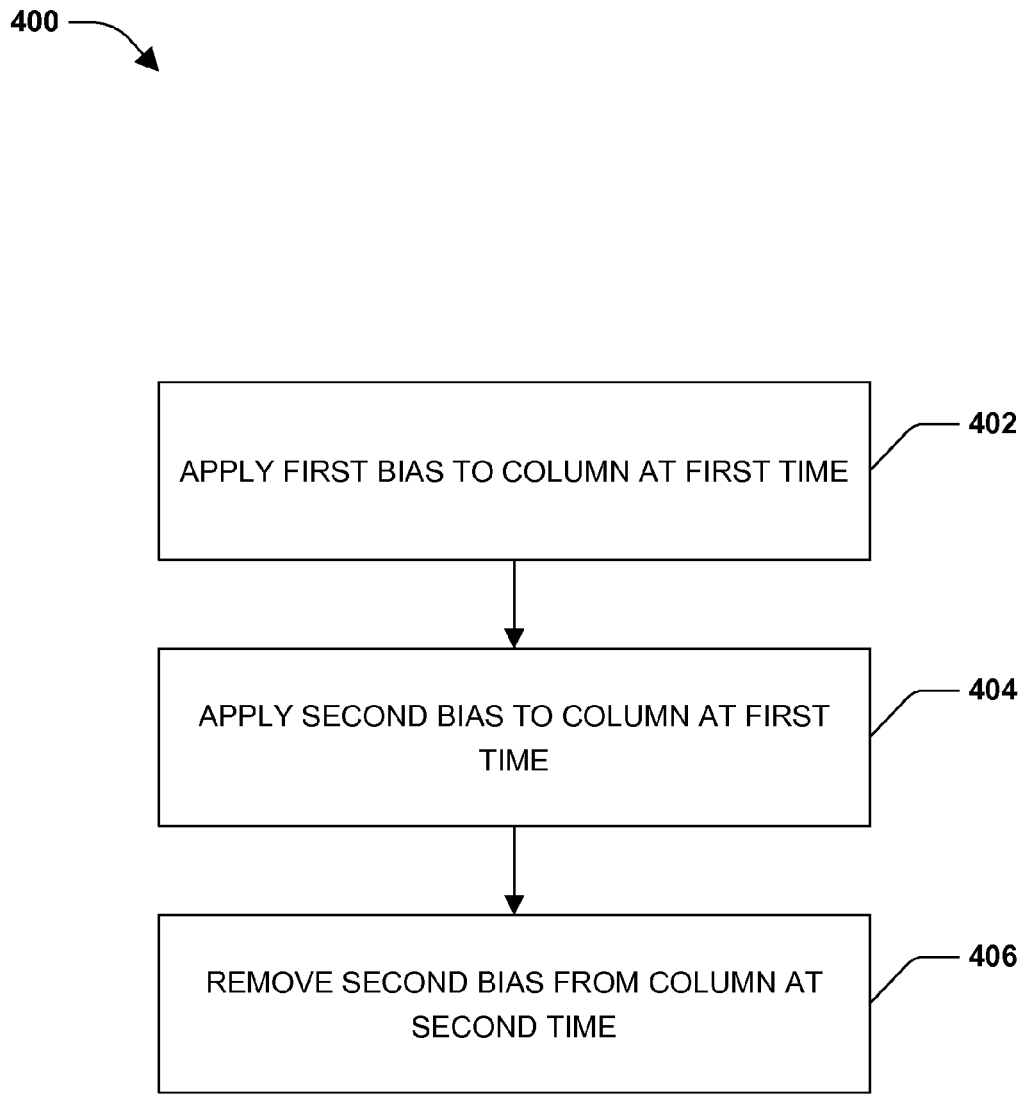
FIG. 4 is a flow diagram of an example method for controlling bias, according to some embodiments.

FIG. 4 is a flow diagram of an example method 400 for controlling bias, according to some embodiments. In some embodiments, the method 400 comprises applying a first bias to a column of one or more pixels at a first time at 402. In some embodiments, the method 400 comprises applying a second bias to the column of one or more pixels at the first time at 404. In some embodiments, the method 400 comprises removing the second bias from the column of one or more pixels at a second time at 406.

According to some aspects, a circuit is provided, comprising a reset transistor comprising a reset gate, a reset source, and a reset drain. In some embodiments, the circuit comprises a source-follower (SF) transistor comprising a SF gate, a SF source, and a SF drain. In some embodiments, the circuit comprises a first transfer transistor comprising a first transfer gate, a first transfer source, and a first transfer drain. In some embodiments, the reset source is connected to the SF gate and the first transfer drain. In some embodiments, the circuit comprises a first bias control portion comprising a first bias transistor comprising a first bias gate, a first bias source, and a first bias drain. In some embodiments, the circuit comprises a second bias control portion comprising a switch and a second bias transistor, the second bias transistor comprising a second bias gate, a second bias source, and a second bias drain. In some embodiments, the switch is connected to the second bias drain. In some embodiments, the SF source is connected to at least one of the switch or the first bias drain.

According to some aspects, an image sensor is provided, comprising at least one of a column of one or more pixels or a row of one or more pixels. In some embodiments, a first pixel of the one or more pixels comprises a reset transistor comprising a reset gate, a reset source, and a reset drain. In some embodiments, the first pixel comprises a source-follower (SF) transistor comprising a SF gate, a SF source, and a SF drain. In some embodiments, the first pixel comprises one or more transfer transistors, a first transfer transistor comprising a first transfer gate, a first transfer source, and a first transfer drain. In some embodiments, the reset source is connected to at least one of the SF gate, the first transfer drain, or one or more additional transfer drains. In some embodiments, the image sensor comprises two or more bias control portions. For example, a first bias control portion comprises a first bias transistor comprising a first bias gate, a first bias source, and a first bias drain. For example, a second bias control portion comprises a switch and a second bias transistor. In some embodiments, the second bias transistor comprises a second bias gate, a second bias source, and a second bias drain. In some embodiments, the switch is connected to the second bias drain. In some embodiments, the SF source is connected to at least one of the switch or the first bias drain.

According to some aspects, a method for controlling bias associated with at least one of a column of pixels or a row of pixels for an image sensor is provided, comprising applying a first bias to a column of one or more pixels at a first time. In some embodiments, the method comprises applying a second bias to the column of one or more pixels at the first time. In some embodiments, the method comprises removing the second bias from the column of one or more pixels at a second time.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing the claims.

Various operations of embodiments are provided herein. The order in which some or all of the operations are described should not be construed as to imply that these operations are necessarily order dependent. Alternative ordering will be appreciated based on this description. Further, it will be understood that not all operations are necessarily present in each embodiment provided herein.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used in either the detailed description or the claims, such terms are intended to be inclusive in a manner similar to the term "comprising".

Also, although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A method for controlling bias associated with a pixel for an image sensor, comprising:
   activating a first bias transistor and a second bias transistor concurrently to apply a first bias to the pixel during a reset operation of the pixel in which a reset transistor is activated to apply a first voltage to a floating diffusion node; and
   decoupling the second bias transistor from the pixel during the reset operation and after a specified period of time to apply a second bias to the pixel, the specified period of time selected based upon a settling time associated with the pixel.

2. The method of claim 1, wherein the first bias transistor and the second bias transistor are maintained in a saturation region of operation during the reset operation.

3. The method of claim 2, comprising:
   sampling an output of the pixel during the reset operation to capture a first sample of a correlated double sampling (CDS).

4. The method of claim 2, comprising:
   recoupling the second bias transistor to the pixel upon activating a transfer transistor electrically disposed between a photodiode of the pixel and the floating diffusion node.

5. The method of claim 1, the reset operation comprising:
   activating a source-follower transistor having a gate coupled to the floating diffusion node and a source/drain region coupled to the first bias transistor responsive to applying the first voltage to the floating diffusion node.

6. The method of claim 1, comprising:
   sampling an output of the pixel to capture a first sample of a correlated double sampling (CDS) responsive to the reset operation being complete.

7. The method of claim 6, wherein the first bias transistor and the second bias transistor are maintained in a saturation region of operation during the reset operation.

8. The method of claim 7, the reset operation being complete upon the reset transistor being deactivated.

9. The method of claim 1, comprising:
   sampling an output of the pixel while the first bias transistor and the second bias transistor are activated to capture a first sample of a correlated double sampling (CDS).

10. The method of claim 1, comprising:
    sampling an output of the pixel responsive to decoupling the second bias transistor from the pixel.

11. A method for controlling bias associated with a pixel for an image sensor, comprising:

during a reset operation:
  activating a first bias transistor and a second bias transistor concurrently to control a bias current at an output node of the pixel;
  activating a reset transistor of the pixel while the first bias transistor and the second bias transistor are activated to apply a first voltage to a floating diffusion node of the pixel, the first voltage activating a source-follower transistor having a source/drain region to which the output node is coupled; and
  decoupling the second bias transistor from the output node after a specified period of time and while the reset transistor and the first bias transistor are activated to apply a second bias current at the output node of the pixel, the specified period of time selected based upon a settling time associated with the pixel.

12. The method of claim 11, comprising:
sampling an output of the pixel at the output node while the reset transistor, the first bias transistor, and the second bias transistor are activated.

13. The method of claim 12, the sampling comprising:
capturing a first sample of a correlated double sampling (CDS).

14. The method of claim 11, comprising:
sampling an output of the pixel at the output node while the reset transistor and the first bias transistor are activated and the second bias transistor is decoupled from the output node.

15. The method of claim 14, the sampling comprising:
capturing a first sample of a correlated double sampling (CDS).

16. The method of claim 11, comprising:
deactivating the reset transistor; and
sampling an output of the pixel at the output node while the first bias transistor is activated and the reset transistor is deactivated.

17. The method of claim 16, the sampling comprising:
capturing a first sample of a correlated double sampling (CDS).

18. The method of claim 11, comprising:
deactivating the reset transistor; and
sampling an output of the pixel at the output node while the first bias transistor is activated, the second bias transistor is decoupled from the output node, and the reset transistor is deactivated.

19. The method of claim 18, the sampling comprising:
capturing a first sample of a correlated double sampling (CDS).

20. A method for controlling bias associated with an output node for a column of pixels, comprising:
during a reset operation of a pixel in which a reset transistor is activated to apply a first voltage to a floating diffusion node:
  activating a first bias transistor and a second bias transistor to apply a first bias current to the output node of the column of pixels; and
  decoupling the second bias transistor from the output node a specified period of time after the second bias transistor is activated to apply a second bias current to the output node of the column of pixels, the second bias current different than the first bias current.

* * * * *